(12) United States Patent
Kim et al.

(10) Patent No.: US 12,344,390 B2
(45) Date of Patent: Jul. 1, 2025

(54) METHOD OF ADJUSTING DIRECTIONAL MOVEMENT ABILITY IN A MULTI-ROTOR AIRCRAFT

(71) Applicant: Bell Textron Inc., Fort Worth, TX (US)

(72) Inventors: Sung K. Kim, Bedford, TX (US); Russell C. Peters, Fort Worth, TX (US); Manish J. Mistry, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/197,212

(22) Filed: Mar. 10, 2021

(65) Prior Publication Data
US 2022/0289400 A1     Sep. 15, 2022

(51) Int. Cl.
*B64D 31/14*     (2006.01)
*B64D 27/24*     (2024.01)
*G05D 1/00*     (2024.01)

(52) U.S. Cl.
CPC .............. *B64D 31/14* (2013.01); *B64D 27/24* (2013.01); *G05D 1/0816* (2013.01); *G05D 1/0858* (2013.01); *G05D 1/102* (2013.01)

(58) Field of Classification Search
CPC ........ B64D 31/14; B64D 27/24; B64D 31/06; G05D 1/0816; G05D 1/0858; G05D 1/102; G05D 1/0066; G05D 1/085
See application file for complete search history.

(56) References Cited

U.S. PATENT DOCUMENTS

| | | | |
|---|---|---|---|
| 2005/0119803 A1* | 6/2005 | Zentgraf | B64G 1/244 |
| | | | 701/13 |
| 2018/0239353 A1* | 8/2018 | Enke | G05D 1/063 |
| 2019/0329898 A1* | 10/2019 | Jenkins | G05D 1/0808 |
| 2020/0307390 A1* | 10/2020 | Clark | B64D 31/00 |
| 2020/0331590 A1* | 10/2020 | Yuksel | B64C 29/02 |
| 2021/0072771 A1* | 3/2021 | Zwiener | B64C 29/00 |
| 2021/0253263 A1* | 8/2021 | Wheeler | B64C 29/0025 |
| 2021/0373579 A1* | 12/2021 | Lukaczyk | B64D 31/00 |

(Continued)

FOREIGN PATENT DOCUMENTS

CN     110254731 A * 9/2019 ............. B64C 27/08

OTHER PUBLICATIONS

Brescianini et al., Tilt-Prioritized Quadrocopter Attitude Control, Mar. 2020, IEEE (Year: 2020).*

(Continued)

*Primary Examiner* — Christian Chace
*Assistant Examiner* — Scott R Jagolinzer
(74) *Attorney, Agent, or Firm* — Frost Brown Todd LLC (57) ABSTRACT

A method of adjusting a directional movement ability in an aircraft having two or more rotors includes receiving a desired thrust demand for each rotor of the two or more rotors, comparing the desired thrust demands to determine a maximum thrust demand, determining whether the maximum thrust demand exceeds a maximum thrust limit of the two or more rotors, and adjusting each desired thrust demand based on whether the maximum thrust demand exceeds the maximum thrust limit to provide an adjusted thrust demand for each rotor of the two or more rotors. Each rotor can be operated based on a respective adjusted thrust demand.

15 Claims, 7 Drawing Sheets

(56) References Cited

U.S. PATENT DOCUMENTS

2022/0043465 A1* 2/2022 Vander Mey ........... B64C 27/10
2022/0135241 A1* 5/2022 Foster ................... B64C 39/024
                                                              244/55
2022/0234747 A1* 7/2022 Bower ................ B64C 29/0033

OTHER PUBLICATIONS

Machine Translation of Chen CN 110254731 A (Year: 2019).*
Faessler, Matthias et al, Thrust Mixing, Saturation, and Body-Rate Control for Accurate Aggressive Quadrotor Flight, IEEE Robotics and Automation Letters, Apr. 2017, pp. 476-482, vol. 2, No. 2.
"Mixing and Actuators", PX4 Autopilot User Guide, Apr. 15, 2021, 15 pages, downloaded from the Internet on Mar. 4, 2021, at https://docs.px4.io/master/en/concept/mixing.html.
"PX4 Autopilot User Guide (master)", Dec. 2, 2020, 3 pages, downloaded from the Internet on Mar. 4, 2021, at https://docs.px4.io/master/en/.

* cited by examiner

METHOD OF ADJUSTING DIRECTIONAL MOVEMENT ABILITY IN A MULTI-ROTOR AIRCRAFT

TECHNICAL FIELD

The present disclosure is directed in general to the field of aircraft and, more particularly, though not exclusively, to a method of adjusting directional movement ability for use in connection with such aircraft.

BACKGROUND OF THE INVENTION

An aircraft, such as a helicopter, can include two or more rotors having a plurality of blades that are rotated to produce thrust and thereby provide propulsion of the aircraft. The thrust produced by the two or more rotors can generally vary to control the position and/or direction of movement of the aircraft. For instance, the thrust produced by the two or more rotors can be controlled to lift the aircraft in a vertical direction upward and/or downward, affect the pitch of the aircraft to move its nose upward and/or downward, affect the roll of the aircraft to rotate it from side to side, and/or turn the aircraft from side to side. In some instances, such as in response to a large gust or other disturbance, a desired thrust demand of the two or more rotors can exceed its thrust capability limit in order to maintain stability or lateral position of the aircraft, while additionally attempting to maintain altitude. When the thrust demand of the two or more rotors exceeds its thrust capability limit, stability control of the aircraft can be limited.

BRIEF SUMMARY OF THE INVENTION

In some instances, it may be desirable to adjust a desired thrust demand for one or more rotors of an aircraft to allow the aircraft to maintain and/or improve its ability move directionally such as to pitch, roll, and/or turn. Accordingly, a method is provided to collectively adjust the desired thrust demand each rotor by an amount of the thrust capability limit exceedance of the highest demand on a rotor in order to maintain the ability of the aircraft to move directionally. In some versions, the method can be further adjusted based on absolute altitude, so that directional movement ability of the aircraft is reduced if aircraft is near the ground in order to prioritize altitude.

In one embodiment, a method of adjusting a directional movement ability in an aircraft having two or more rotors can comprise the steps of: receiving a plurality of desired thrust demands such that a desired thrust demand is received for each rotor of the two or more rotors; comparing the plurality of desired thrust demands to determine a maximum thrust demand of the plurality of desired thrust demands; determining whether the maximum thrust demand exceeds a maximum thrust limit of the two or more rotors; adjusting each desired thrust demand of the plurality of desired thrust demands based on whether the maximum thrust demand exceeds the maximum thrust limit of the two or more rotors to provide a plurality of adjusted thrust demands such that an adjusted thrust demand is provided for each rotor of the two or more rotors; and operating each rotor of the two or more rotors based on a respective adjusted thrust demand of the plurality of adjusted thrust demands.

In another embodiment, a method of adjusting a directional movement ability in an aircraft having two or more rotors can comprise the steps of: receiving a plurality of desired thrust demands such that a desired thrust demand is received for each rotor of the two or more rotors; comparing the plurality of desired thrust demands to determine a maximum thrust demand of the plurality of desired thrust demands; determining whether the maximum thrust demand exceeds a maximum thrust limit of the two or more rotors; comparing the plurality of desired thrust demands to determine a minimum thrust demand of the plurality of desired thrust demands; determining whether the minimum thrust demand is below a minimum thrust limit of the two or more rotors; adjusting each desired thrust demand of the plurality of desired thrust demands based on a select one or both of an amount that the maximum thrust demand exceeds the maximum thrust limit and an amount that the minimum thrust demand is below the minimum thrust limit to provide a plurality of adjusted thrust demands such that an adjusted thrust demand is provided for each rotor of the two or more rotors; and operating each rotor of the two or more rotors based on a respective adjusted thrust demand of the plurality of adjusted thrust demands.

In another embodiment, a flight control system for controlling directional movement ability of an aircraft having two or more rotors can comprise a control coupled with at least one motor of each of the two or more rotors such that the control is configured to actuate the at least one motor to thereby drive the two or more rotors. The control can comprise: a max algorithm configured to receive a desired thrust demand for each rotor of the one or more rotors, wherein the max algorithm is configured to determine a maximum thrust demand of the received desired thrust demands; a first difference algorithm configured to receive the maximum thrust demand, wherein the first difference algorithm is configured to determine a first difference between the maximum thrust demand and a maximum thrust limit; a first switch configured to receive the first difference, wherein the first switch is configured to transmit a first signal having a value of the first difference when the first difference is greater than zero, wherein the first switch is configured to transmit the first signal having a value of zero when the first difference is equal to or less than zero; and at least one second difference algorithm configured to receive the first signal from the first switch, wherein the at least one second difference algorithm is configured to subtract the value of the first signal from each of the received thrust demands to provide an adjusted thrust demand for each rotor of the two or more rotors; wherein the control is configured to actuate the at least one motor of each of the two or more rotors based on the respective adjusted thrust demand.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
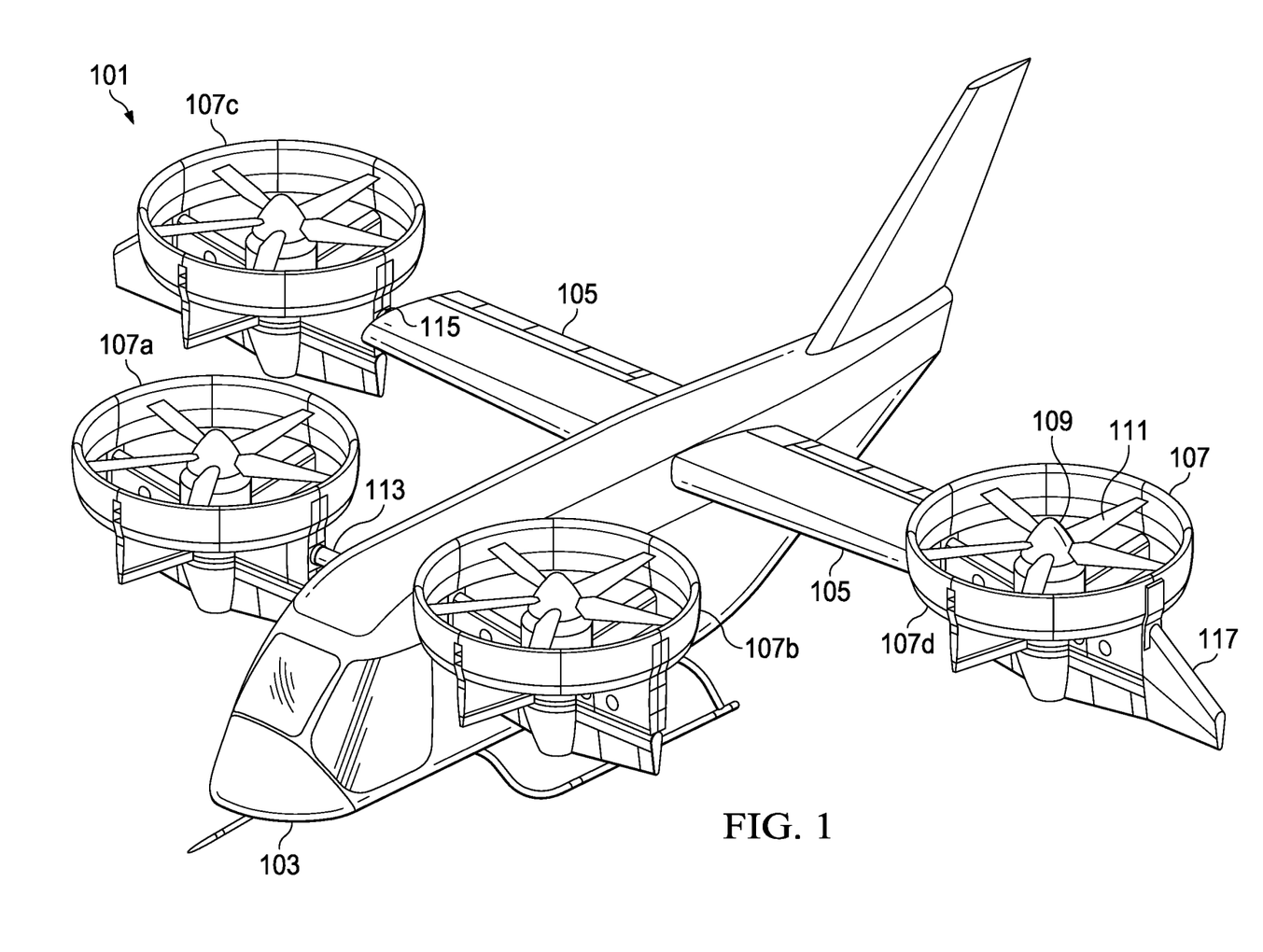
FIG. 1 is a perspective view of an exemplary tiltrotor aircraft, showing the aircraft operating in a helicopter mode.
Figure 2:
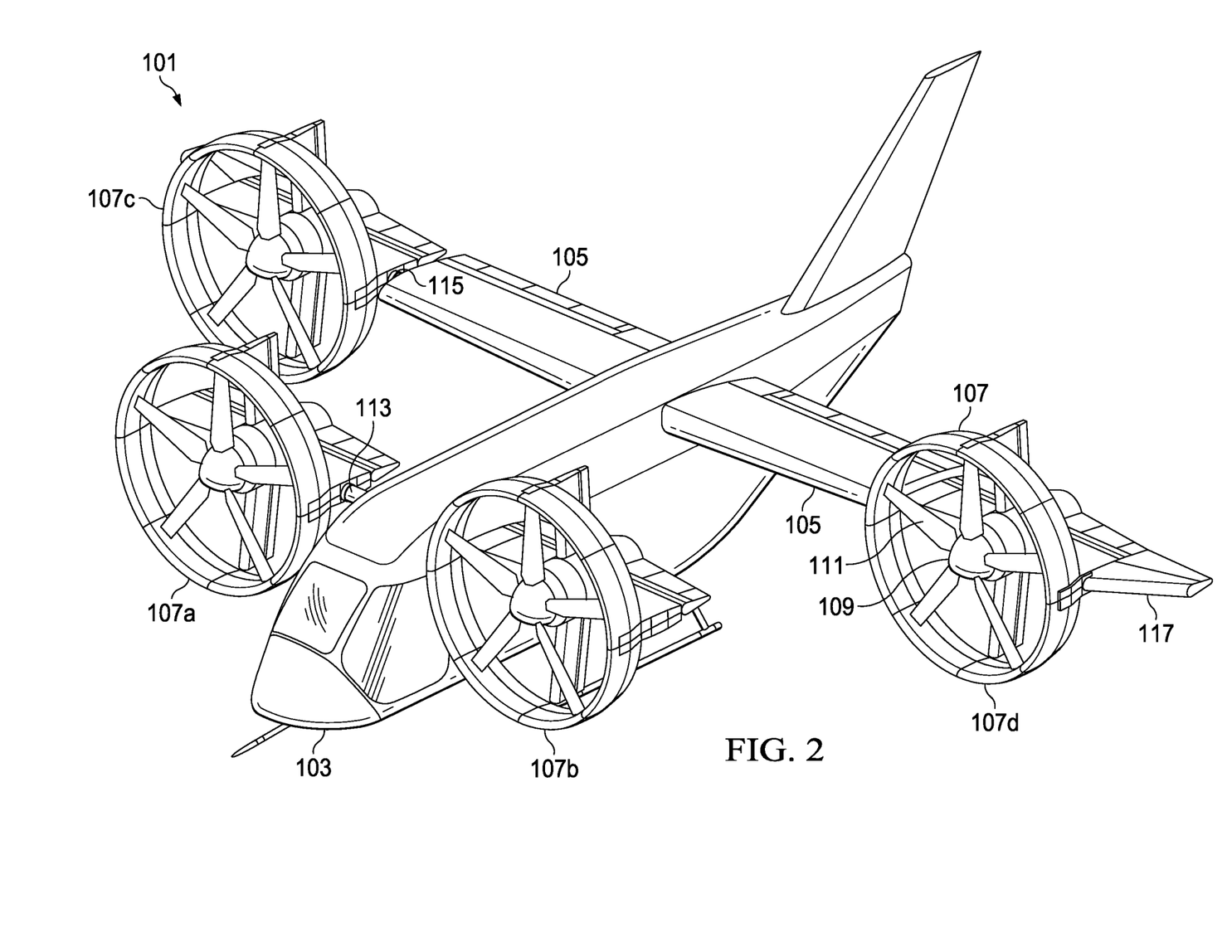
FIG. 2 is a perspective view of the aircraft of FIG. 1, showing the aircraft operating in an airplane mode.

Referring now to FIGS. 1 and 2, an exemplary tiltrotor aircraft 101 is shown that includes ducted rotors (or fans). The tiltrotor aircraft 101 is convertible between a helicopter mode (shown in FIG. 1), which allows for vertical takeoff and landing, hovering, and low speed directional movement, and an airplane mode (shown in FIG. 2), which allows for forward flight as well as horizontal takeoff and landing. Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107 to produce thrust.

In the illustrated version, aircraft 101 is configured with four ducts 107, including a first duct 107a and a second duct 107b that form a forward pair of ducts and a third duct 107c and a fourth duct 107d that form an aft pair of ducts. Each duct 107 is rotatably coupled to fuselage 103 of aircraft 101 via a spindle. Ducts 107a and 107b are coupled directly to fuselage 103 by a respective spindle 113. Ducts 107c and 107d are each independently coupled to a corresponding end of wing 105 via a respective spindle 115. As shown, each of ducts 107c and 107d includes a winglet 117 that is coupled thereto. It should be appreciated that aircraft 101 is not limited to the illustrated configuration having four ducts 107, and that aircraft 101 may alternatively be implemented with more or fewer ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight. In particular, in airplane mode, ducts 107 direct their respective thrusts in the aft direction to propel aircraft 101. Aircraft 101 is operable to fly in all directions during the vertical takeoff and landing (i.e., helicopter) mode configuration of FIG. 1, although faster forward flight is achievable while in the forward flight (i.e., airplane) mode configuration of FIG. 2. Ducts 107 may be tiltable between the vertical and horizontal positions by spindles 113, 115, which are rotatable in response to commands originating from a pilot and/or a flight control system of the aircraft 101.

Figure 3:
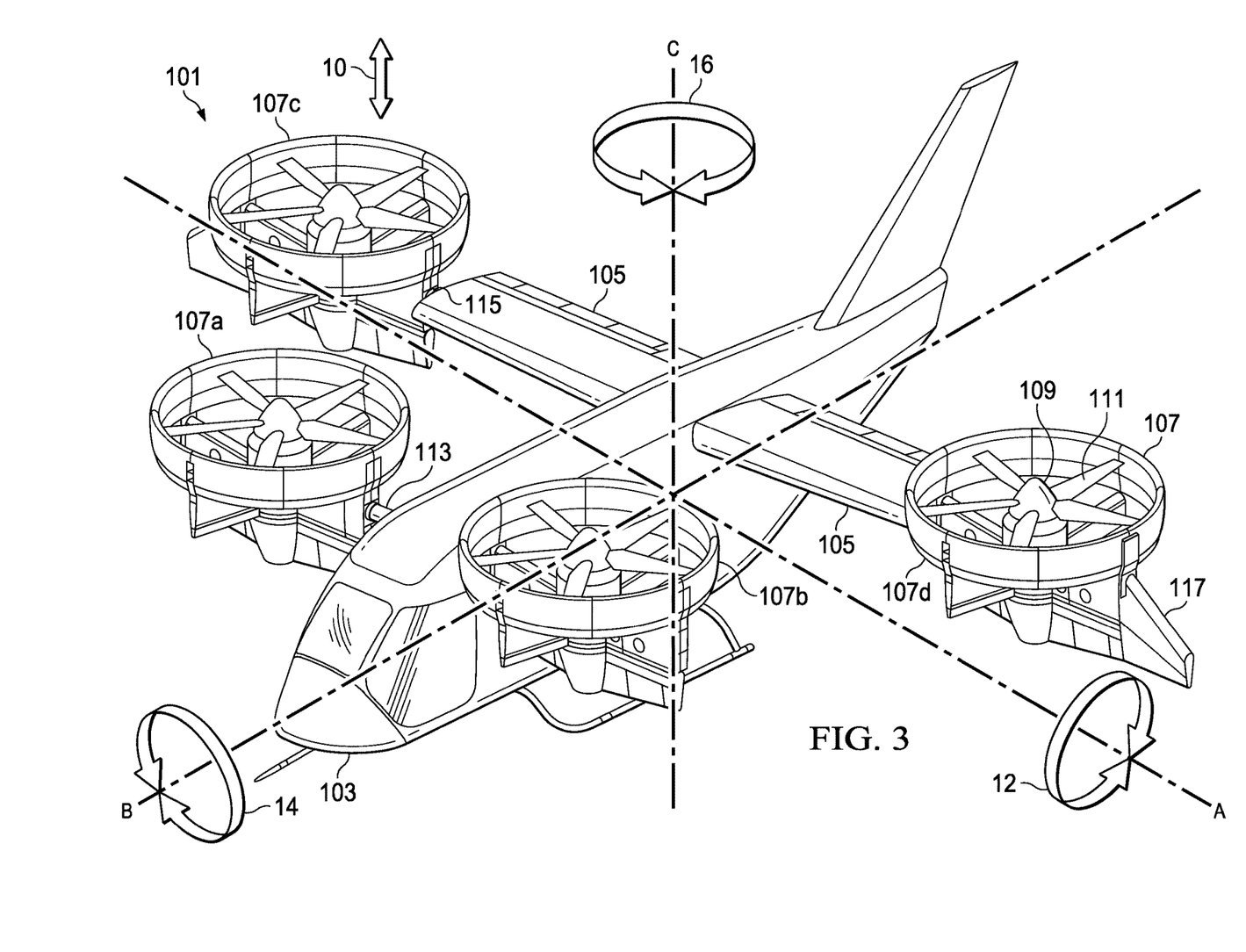
FIG. 3 is a perspective view of the aircraft of FIG. 1, showing directional movements of the aircraft.

Referring to FIG. 3, rotors 109 of ducts 107 can be selectively operated at a desired thrust demand level to produce varying amounts of thrust to control the position and/or directional movement of aircraft 101. For instance, the thrust of rotors 109 can be collectively controlled to lift and/or lower aircraft 101 vertically, as shown by arrows 10. The thrust of two or more rotors 109 can be selectively controlled to provide a differential between the two or more rotors 109 to affect the pitch of aircraft 101 to rotate aircraft 101 about a first axis A to move its nose upward and/or downward as shown by arrows 12, to affect the roll of aircraft 101 to rotate aircraft 101 about a second axis B to roll aircraft 101 from side to side as shown by arrows 14, and/or to rotate aircraft 101 about a third axis C to turn aircraft 101 from side to side as shown by arrows 16. Still other suitable movements of aircraft 101 can be used.

Figure 4:
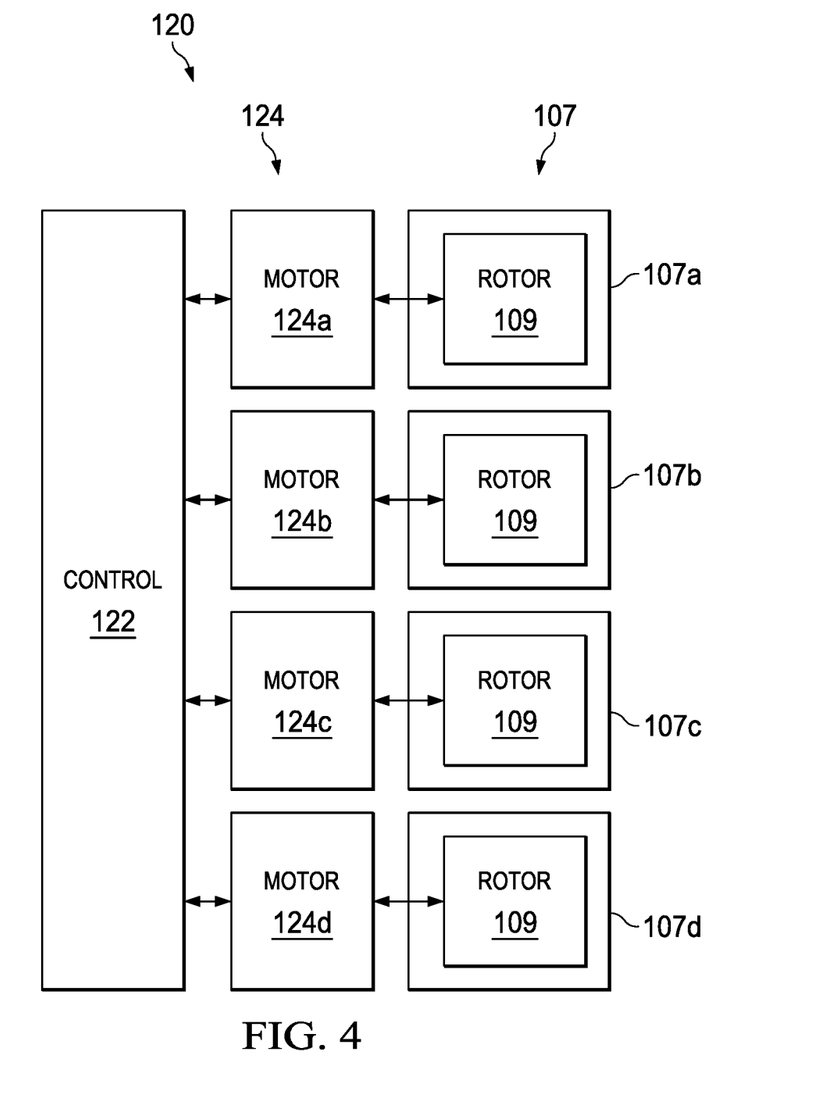
FIG. 4 is a schematic of an example of a flight control system to control the direction movement of the aircraft of FIG. 3 by driving two or more rotors of the aircraft at a desired thrust demand.

For illustrative purposes, an example of a flight control system 120 is shown in FIG. 4 for controlling a thrust of each rotor 109 of ducts 107 to thereby control the position and/or direction of aircraft 101 (see FIG. 3). Flight control system 120 of the illustrated version comprises a control 122 coupled with one or more motors 124, which are coupled with one or more rotors 109 of ducts 107. Control 122 can include a processor that is coupled with motors 124 and/or rotors 109 such that control 122 is configured to send and/or receive data from motors 124 and/or rotors 109. Accordingly, control 122 is configured to actuate motors 124. Motors 124 are coupled with rotors 109 such that motors 124 are configured to drive rotors 109 to produce thrust when motors 124 are actuated.

As shown in FIGS. 3-4, control 122 can selectively actuate motors 124 by transmitting a thrust demand signal, such as a desired level of thrust for a respective rotor 109, to motors 124 based on commands originating from control 122 and/or a pilot to control the position and/or direction of aircraft 101. Motors 124 can then drive rotors 109 based on the desired thrust demand. For instance, control 122 can transmit a first thrust demand to a first motor 124a to drive rotor 109 of a first duct 107a, a second thrust demand to a second motor 124b to drive rotor 109 of a second duct 107b, a third thrust demand to a third motor 124c to drive rotor 109 of a third duct 107c, and/or a fourth thrust demand to a fourth motor 124d to drive rotor 109 of a fourth duct 107d. The thrust demands transmitted by control 122 can be the same for each rotor 109 to control the lift and/or altitude of aircraft 101 as shown by arrows 10 and/or vary between one or more rotors 109 to provide a differential between one or more rotors 109 to control the pitch of aircraft 101 by rotating aircraft 101 about first axis A, the roll of aircraft 101 by rotating aircraft 101 about second axis B, and/or turning of aircraft 101 by rotating aircraft 101 about third axis C. Still other suitable configurations for flight control system 120 will be apparent to one with ordinary skill in the art in view of the teachings herein. For instance, while the illustrated version shows a motor 124 coupled with a rotor 109 of each of the four ducts 107, any other suitable number of motors 124 and/or ducts 107 can be used. Additionally or alternatively, flight control system 120 can include motors 124 as a separate component from ducts 107 and/or motors 124 can be incorporated into ducts 107.

In some instances, such as in response to a heavy amount of weight and/or a large gust or other disturbance, a thrust demand of one or more rotors 109 can exceed its thrust capability limit in order to maintain stability or lateral position of aircraft 101, while additionally attempting to maintain altitude. This can limit the stability control of aircraft 101. Accordingly, it may be desirable to adjust the desired thrust demand for one or more rotors 109 to allow aircraft 101 to maintain and/or improve the ability of aircraft 101 to pitch, roll, and/or turn such as in the event of a disturbance. An exemplary method is thereby provided to collectively adjust the desired thrust demand in rotors 109 by an amount of the thrust capability limit exceedance of the highest demand on a rotor 109 in order to maintain pitch, roll, and/or turning ability of aircraft 101. In some versions, the method can be further adjusted based on absolute altitude, so that pitch, roll, and/or turning is reduced if aircraft 101 is near the ground in order to prioritize altitude. While a collective thrust of rotors 109 can be limited to improve pitch, roll, and/or turning authority of aircraft 101 such as during a disturbance, collective thrust performance can be increased when pitch, roll, and/or turning demands are lower.

Figure 5:
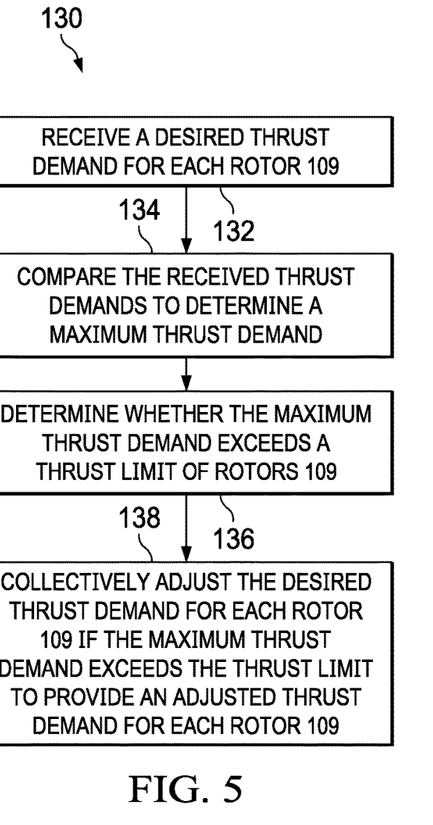
FIG. 5 is a flowchart of an exemplary method of adjusting the desired thrust demand of the two or more rotors of FIG. 4.

I. An Exemplary Method of Adjusting Thrust Demand Based on A Maximum Thrust Limit Referring to FIG. 5, a first exemplary method 130 for adjusting a thrust demand is shown to adjust a pitch, roll, and/or turning ability of aircraft 101 (see FIG. 3). Method 130 comprises receiving a desired thrust demand for each rotor 109 (step 132) that can be originated by a flight control system and/or a pilot. Method 130 further comprises comparing the received thrust demands to determine a maximum thrust demand (step 134) and determining whether the maximum thrust demand exceeds a thrust limit of rotors 109 (step 136). If the maximum thrust demand exceeds the thrust limit, method 130 comprises collectively adjusting the desired thrust demand for each rotor 109 to provide an adjusted thrust demand for each rotor 109 (step 138). For instance, the desired thrust demand for each rotor 109 can be reduced by the amount that the maximum thrust demand exceeds the thrust limit.

Figure 6:
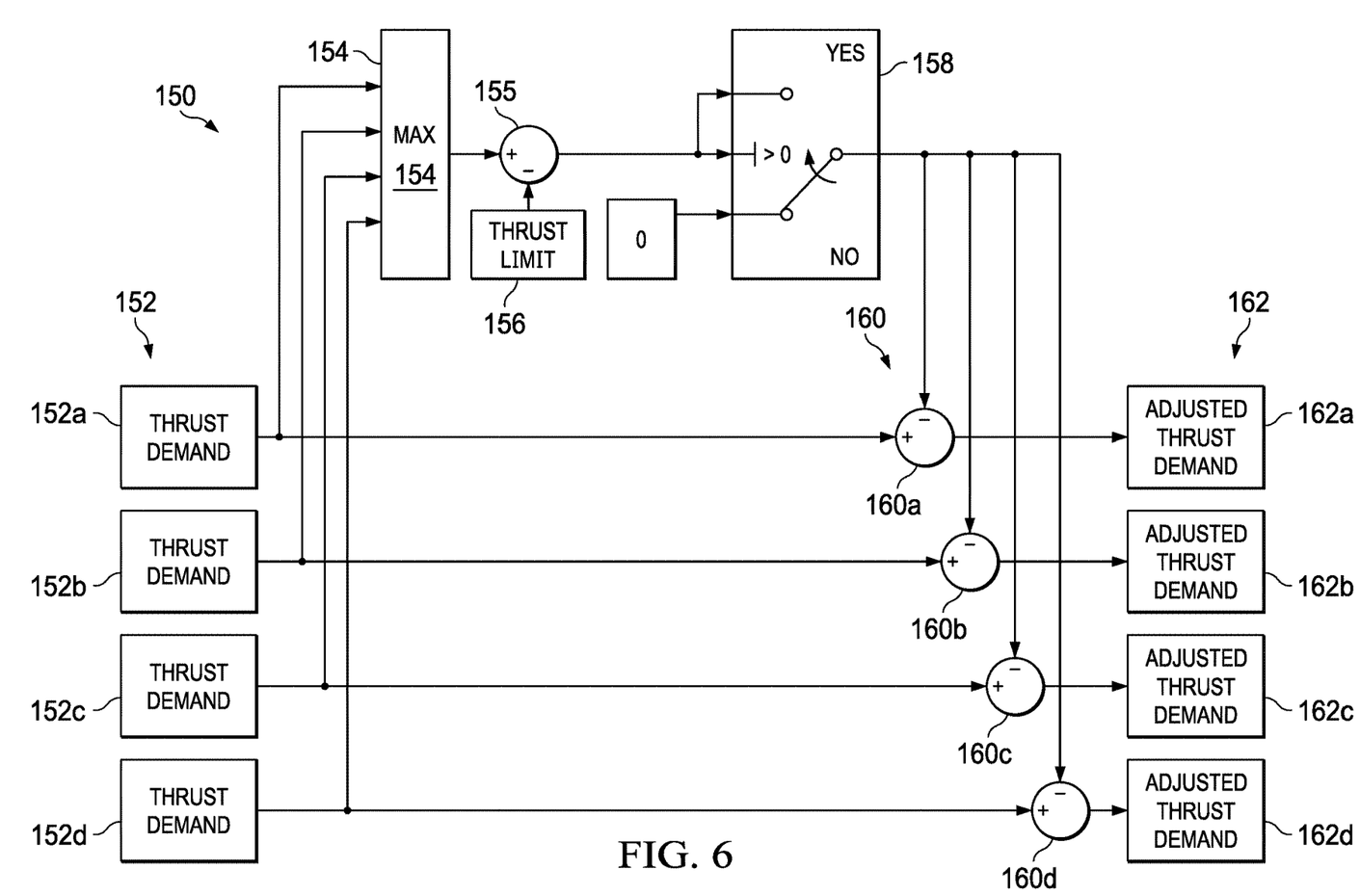
FIG. 6 is a block diagram of the method of FIG. 5 that can be incorporated into the flight control system of FIG. 4.

A block diagram 150 is shown in FIG. 6 of method 130 (see FIG. 5) that can be incorporated into control 122 (see FIG. 4) of flight control system 120 (see FIG. 4). For instance, a desired thrust demand 152 for each rotor 109 can be received by a max algorithm 154. Max algorithm 154 is configured to determine a maximum thrust demand of the received thrust demands 152. A difference algorithm 155 is configured to receive the maximum thrust demand signal from max algorithm 154 to determine a difference between the maximum thrust demand and a thrust limit 156 by subtracting thrust limit 156 from the maximum thrust demand. Accordingly, the maximum thrust demand exceeds thrust limit 156 if the difference is greater than zero and the maximum thrust demand does not exceed thrust limit 156 if the difference is equal to or less than zero.

A switch 158 is configured to receive the difference signal from difference algorithm 155 of the difference between the maximum thrust demand and thrust limit 156. If the difference is greater than zero such that the maximum thrust demand exceeds thrust limit 156, switch 158 is configured to transmit a signal having a value of the difference, or the amount that the maximum thrust demand exceeds thrust limit 156. If the difference is equal to or less than zero, switch 158 is configured to transmit a signal having a value of zero. A plurality of difference algorithms 160 are then configured to receive the signal from switch 158 to subtract that value from each received thrust demand 152 to provide a respective adjusted thrust demand 162. Accordingly, if the maximum thrust demand exceeds thrust limit 156, each thrust demand 152 is collectively reduced by the amount that the maximum thrust demand exceeds thrust limit 156. If the maximum thrust demand does not exceed thrust limit 156, each thrust demand 152 is adjusted by a value of zero such that each adjusted thrust demand 162 is equal to the respective received thrust demand 152.

In the illustrated version, a thrust demand 152 is received for each rotor 109 (see FIG. 3) such that a first thrust demand 152*a*, a second thrust demand 152*b*, a third thrust demand 152*c*, and a fourth thrust demand 152*d* is received. A maximum thrust demand of first, second, third, and fourth received thrust demands 152*a*, 152*b*, 152*c*, 152*d* is determined by max algorithm 154. The difference between the maximum thrust demand and thrust limit 156 is determined at difference algorithm 155. The difference is received by switch 158. If the difference is greater than zero, switch 158 transmits the difference to difference algorithms 160 such that first thrust demand 152*a* is reduced by the difference at first difference algorithm 160*a* to provide a first adjusted thrust demand 162*a*, second thrust demand 152*b* is reduced by the difference at second difference algorithm 160*b* to provide a second adjusted thrust demand 162*b*, third thrust demand 152*c* is reduced by the difference at third difference algorithm 160*c* to provide a third adjusted thrust demand 162*c*, and fourth thrust demand 152*c* is reduced by the difference at fourth difference algorithm 160*d* to provide a fourth adjusted thrust demand 162*d*. If the difference is equal to or less than zero, switch 158 transmits an amount of zero to each difference algorithm 160 such that each thrust demand 152 is adjusted by an amount of zero to provide adjusted thrust demands 162.

Referring to FIGS. 3-6, each adjusted thrust demand 162 can then be transmitted to motors 124 to operate the respective rotor 109 of ducts 107 based on adjusted thrust demands 162. For instance, control 122 can transmit first adjusted thrust demand 162*a* to first motor 124*a* to control rotor 109 of first duct 107*a* based on first adjusted thrust demand 162*a*, second adjusted thrust demand 162*b* to second motor 124*b* to control rotor 109 of second duct 107*b* based on second adjusted thrust demand 162*b*, third adjusted thrust demand 162*c* to third motor 124*c* to control rotor 109 of third duct 107*c* based on third adjusted thrust demand 162*c*, and fourth adjusted thrust demand 162*d* to fourth motor 124*d* to control rotor 109 of fourth duct 107*d* based on fourth adjusted thrust demand 162*d*. Rotors 109 can thereby be operated based on adjusted thrust demand 162 to control the positioned and/or direction of aircraft 101.

As an example, each rotor 109 of ducts 107 can be operated between about 0% and about 100% of the thrust limit capability of each rotor 109. For illustrative purposes, if each rotor 109 is selected to operate at about 50% of the thrust limit capability during operation of aircraft 101, each desired thrust demand 152 can be received as 50%. When thrust demands 152 are compared, the maximum thrust demand is thereby 50%. The maximum thrust demand of 50% can then be reduced by thrust limit 156 of 100%. Because this difference provides an amount that is less than zero, the maximum thrust demand does not exceed thrust limit 156. Accordingly, each thrust demand 152 can be adjusted by an amount of zero to provide an adjusted thrust demand 162 for each rotor 109 that is equal to the desired thrust demand 152 to continue operating each rotor 109 at 50% capability. Because the thrust limit capability of each rotor 109 is not exceeded, aircraft 101 remains capable of pitching, rolling, and/or turning if desired.

Alternatively, if each rotor 109 is selected to operate at or near about 100% of the thrust limit capability of each rotor 109, the ability of aircraft 101 to pitch, roll, and/or turn may be limited because a desired thrust demand may exceed 100% of the thrust limit capability. For instance, in order to pitch, roll, and/or turn aircraft 101, a differential thrust may be needed between one or more rotors 109. To provide a differential between one or more rotors 109, for illustrative purposes, first and second thrust demands 152a, 152b to operate rotors 109 of first and second ducts 107a, 107b can be set to 80% and third and fourth thrust demands 152c, 152d to operate rotors of third and fourth ducts 107c, 107d can be set to 110% to provide a differential of 30% between first and second thrust demands 152a, 152b and third and fourth thrust demands 152c, 152d. Without adjustment, third and fourth motors 124c, 124d for operating rotors 109 of third and fourth ducts 107c, 107d may not be capable of physically exceeding 100% of the thrust limit capability such that a differential between first and second motors 124a, 124b and third and fourth motors 124c, 124d may be limited to 20%. This may thereby limit the ability of aircraft 101 to pitch, roll, and/or turn.

Accordingly, control 122 can adjust thrust demands 152 to maintain the differential between one or more rotors 109 to allow aircraft 101 to pitch, roll, and/or turn when a desired thrust demand 152 exceeds the thrust limit capability of rotors 109. For instance, the desired thrust demands 152 can be compared to determine a maximum thrust demand of 110%. A thrust limit 156 of 100% can be subtracted from the maximum thrust demand to provide a difference of 10% that the maximum thrust demand exceeds thrust limit 156. Because the difference is greater than zero, switch 158 can transmit the value of the difference of 10%. Each thrust demand 152 can then be reduced by the difference of 10% to provide a first and second adjusted thrust demand 162a, 162b of 70% and a third and fourth adjusted thrust demand 162c, 162d of 100%. Accordingly, thrust demands 152 were collectively reduced to provide an adjusted thrust demand 162 that maintains a desired differential of 30% between one or more rotors 109 to allow aircraft 101 to pitch, roll, and/or turn as desired. Still other suitable methods for adjusting thrust demand of aircraft 101 will be apparent to one with ordinary skill in the art in view of the teachings herein.

II. Exemplary Method of Adjusting Thrust Demand Based on A Minimum Thrust Limit

Additionally or alternatively, a respective thrust demand for operating rotors 109 can be adjusted based on a minimum thrust limit of rotors 109. This may be desirable if aircraft 101 is operating near the ground to inhibit rotors 109 from operating below the minimum thrust limit to provide a sufficient altitude of aircraft 101. In some versions, this may limit the amount of adjustment of a desired thrust demand based on a minimum thrust limit of rotors 109 such that an ability of aircraft 101 to pitch, roll, and/or turn is reduced if aircraft 101 is near the ground in order to prioritize altitude.

Figure 7:
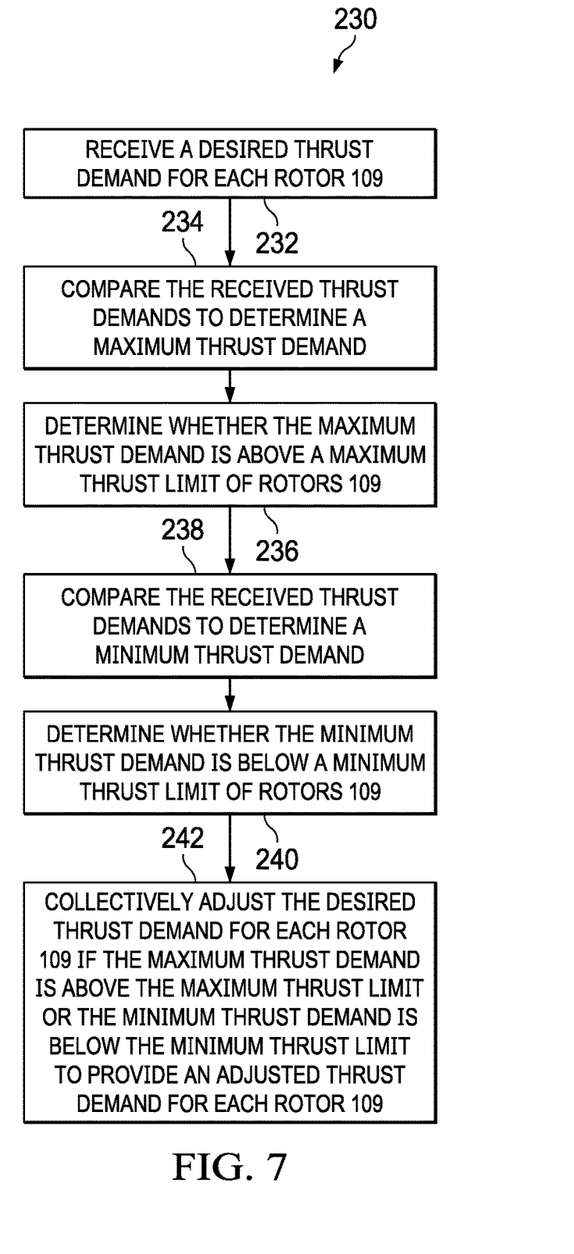
FIG. 7 is a flowchart of another exemplary method of adjusting the desired thrust demand of the two or more rotors of FIG. 4.

Referring to FIG. 7, a second exemplary method 230 is shown for adjusting a thrust demand based on a maximum thrust limit and/or a minimum thrust limit. Method 230 comprises receiving a desired thrust demand for each rotor 109 (step 232) that can be originated by a flight control system and/or a pilot. Method 230 further comprises comparing the received thrust demands to determine a maximum thrust demand (step 234) and determining whether the maximum thrust demand is above a maximum thrust limit of rotors 109 (step 236). Method 230 further comprises comparing the received thrust demands to determine a minimum thrust demand (step 238) and determining whether the minimum thrust demand is below a minimum thrust limit of rotors 109 (step 240). If the maximum thrust demand above the maximum thrust limit and/or if the minimum thrust demand is below the minimum thrust limit, method 230 comprises collectively adjusting the desired thrust demand for each rotor 109 to provide an adjusted thrust demand for each rotor 109 (step 242). For instance, the desired thrust demand for each rotor 109 can be reduced based on the amount that the maximum thrust demand exceeds the maximum thrust limit and/or based on the amount that the minimum thrust demand is below the minimum thrust limit.

Figure 8:
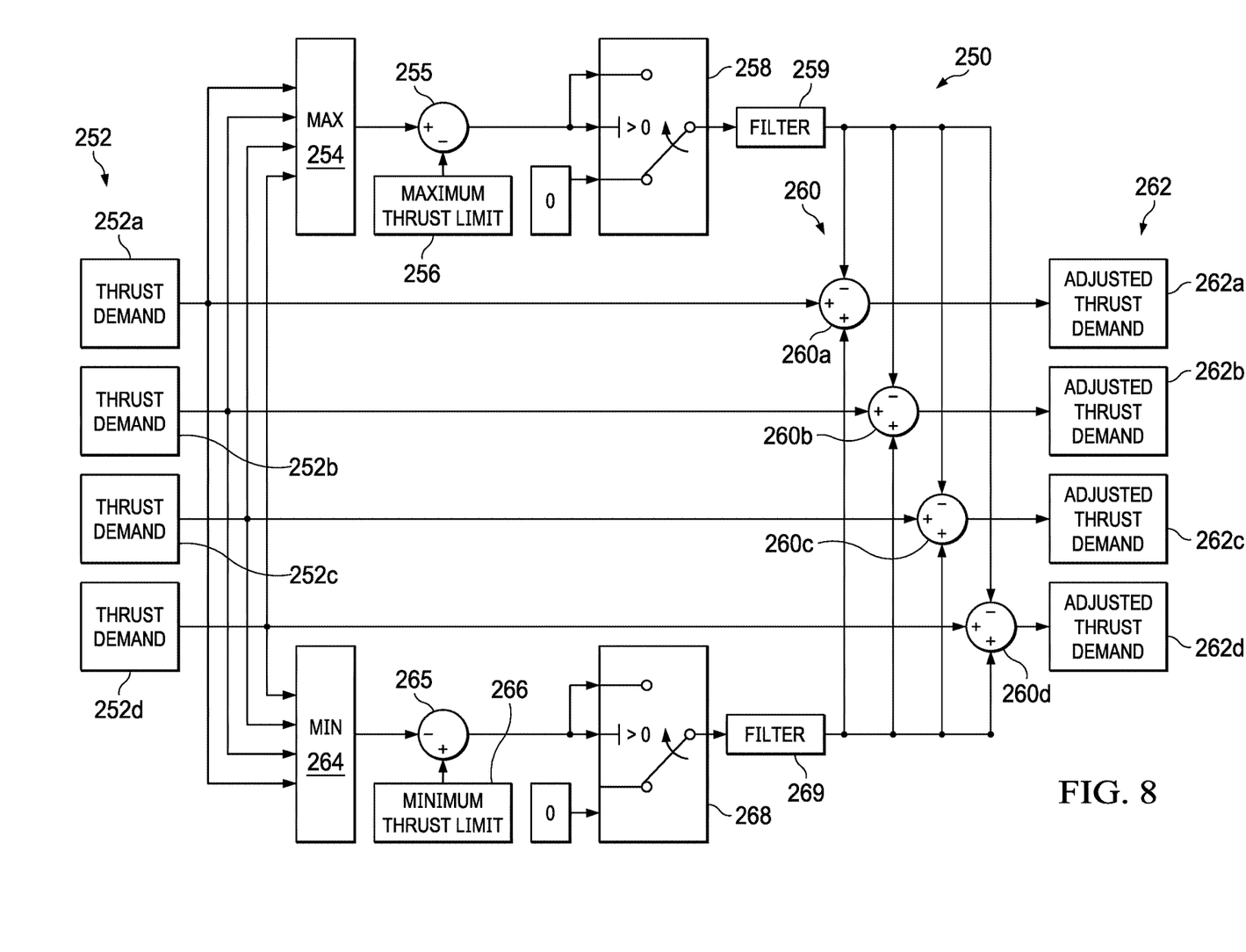
FIG. 8 is a block diagram of the method of FIG. 7 that can be incorporated into the flight control system of FIG. 4.

A block diagram 250 of method 230 is shown in FIG. 8 that may be incorporated into control 122 (see FIG. 4). For instance, a desired thrust demand 252 for each rotor 109 can be received. A max algorithm 254 is configured to determine a maximum thrust demand of the received thrust demands 252. A difference algorithm 255 is configured to determine a difference between the maximum thrust demand and a maximum thrust limit 256 by subtracting maximum thrust limit 256 from the maximum thrust demand. Accordingly, the maximum thrust demand exceeds maximum thrust limit 256 if the difference is greater than zero and the maximum thrust demand does not exceed maximum thrust limit 256 if the difference is equal to or less than zero.

A switch 258 is configured to receive the difference between the maximum thrust demand and maximum thrust limit 256. If the difference is greater than zero such that the maximum thrust demand exceeds maximum thrust limit 256, switch 258 is configured to transmit a signal having a value of the difference, or the amount that the maximum thrust demand exceeds maximum thrust limit 256. If the difference is equal to or less than zero, switch 258 is configured to transmit a signal having a value of zero. The signal transmitted by switch 258 is then received by a filter 259 in the illustrated version. Filter 259 can include a variable gain and/or a dynamic filter such that filter 259 can be configured to reduce the signal and/or smooth the signal. One possible use of filter 259 is to prioritize altitude during flight by preventing a thrust that is too small. Still other suitable configurations for filter 259 will be apparent to one with ordinary skill in the art in view of the teachings herein. For instance, filter 259 can be configured to momentarily increase the output signal of filter 259. It should be noted that filter 259 is optional. A plurality of difference algorithms 260 are then configured to receive the signal from filter 259 to subtract that value from each received thrust demand 252 to provide a respective adjusted thrust demand 262. Accordingly, if the maximum thrust demand exceeds maximum thrust limit 256, each thrust demand 252 is collectively reduced by the filtered amount that the maximum thrust demand exceeds maximum thrust limit 256. If the maximum thrust demand does not exceed maximum thrust limit 256, each thrust demand 252 is adjusted by zero.

Additionally or alternatively, a min algorithm 264 is configured to determine a minimum thrust demand of the received thrust demands 252. A difference algorithm 265 is configured to determine a difference between the minimum thrust demand and a minimum thrust limit 266 by subtracting the minimum thrust demand from minimum thrust limit 266. In some versions, minimum thrust limit 266 can vary based on the altitude of aircraft 101 (see FIG. 3). Accordingly, the minimum thrust demand is below minimum thrust limit 266 if the difference is greater than zero and the minimum thrust demand is above minimum thrust limit 266 if the difference is equal to or less than zero.

A switch 268 is configured to receive the difference between the minimum thrust demand and minimum thrust limit 266. If the difference is greater than zero such that the minimum thrust demand is below minimum thrust limit 266, switch 268 is configured to transmit a signal having a value of the difference, or the amount that the minimum thrust demand is below minimum thrust limit 266. If the difference is equal to or less than zero, switch 268 is configured to transmit a signal having a value of zero. The signal transmitted by switch 268 is then received by a filter 269 in the illustrated version. Filter 269 can include a variable gain and/or a dynamic filter such that filter 269 can be configured to reduce the signal and/or smooth the signal. Still other suitable configurations for filter 269 will be apparent to one with ordinary skill in the art in view of the teachings herein. For instance, filter 269 can be configured to momentarily increase the output signal of filter 269. It should be noted that filter 269 is optional. The plurality of difference algorithms 260 are then configured to receive the signal from filter 269 to add that amount to each received thrust demand 252 to provide a respective adjusted thrust demand 262. Accordingly, if the minimum thrust demand is below minimum thrust limit 266, each thrust demand 252 is collectively increased by the filtered amount that the minimum thrust demand is below minimum thrust limit 266. If the minimum thrust demand is not below minimum thrust limit 266, each thrust demand 252 is adjusted by zero.

In the illustrated version, a thrust demand 252 is received for each rotor 109 (see FIG. 3) such that a first thrust demand 252a, a second thrust demand 252b, a third thrust demand 252c, and a fourth thrust demand 252d is received. A maximum thrust demand of first, second, third, and fourth received thrust demands 252a, 252b, 252c, 252d is determined by max algorithm 254. The difference between the maximum thrust demand and maximum thrust limit 256 is determined at difference algorithm 255. The difference is received by switch 258. If the difference is greater than zero, switch 258 transmits a signal having a value of the difference through filter 259 to difference algorithms 260 such that first thrust demand 252a is reduced by the filtered signal at first difference algorithm 260a, second thrust demand 252b is reduced by the filtered signal at second difference algorithm 260b, third thrust demand 252c is reduced by the filtered signal at third difference algorithm 260c, and fourth thrust demand 252c is reduced by the filtered signal at fourth difference algorithm 260d. If the difference is equal to or less than zero, switch 258 transmits a signal through filter 259 having an amount of zero.

In the illustrated version, a minimum thrust demand of first, second, third, and fourth received thrust demands 252a, 252b, 252c, 252d is also determined by min algorithm 264. The difference between the minimum thrust demand and minimum thrust limit 266 is determined at difference algorithm 265. The difference is received by switch 268. If the difference is greater than zero, switch 268 transmits a signal having a value of the difference through filter 269 to difference algorithms 260 such that first thrust demand 252a is increased by the filtered signal at first difference algorithm 260a, second thrust demand 252b is increased by the filtered signal at second difference algorithm 260b, third thrust demand 252c is increased by the filtered signal at third difference algorithm 260c, and fourth thrust demand 252c is increased by the filtered signal at fourth difference algorithm 260d. If the difference is equal to or less than zero, switch 268 transmits a signal through filter 269 having an amount of zero. The adjusted signals provided by difference algorithms 260 based on maximum thrust limit 256 and minimum thrust limit 266 thereby form adjusted thrust demands 262. For instance, first difference algorithm 260a is configured to provide a first adjusted thrust demand 262a, second difference algorithm 260b is configured to provide a second adjusted thrust demand 262b, third difference algorithm 260c is configured to provide a third adjusted thrust demand 262c, and fourth difference algorithm 260c is configured to provide a fourth adjusted thrust demand 262d.

Referring to FIGS. 3-4 and 7-8, each adjusted thrust demand 262 can then be transmitted to motors 124 to operate the respective rotor 109 of ducts 107 based on adjusted thrust demands 262. For instance, control 122 can transmit first adjusted thrust demand 262a to first motor 124a to control rotor 109 of first duct 107a based on first adjusted thrust demand 262a, second adjusted thrust demand 262b to second motor 124b to control rotor 109 of second duct 107b based on second adjusted thrust demand 262b, third adjusted thrust demand 262c to third motor 124c to control rotor 109 of third duct 107c based on third adjusted thrust demand 262c, and fourth adjusted thrust demand 262d to fourth motor 124d to control rotor 109 of fourth duct 107d based on fourth adjusted thrust demand 262d. Rotors 109 can thereby be operated based on adjusted thrust demand 262 to control the position and/or direction of aircraft 101.

As an example, each rotor 109 of ducts 107 can be operated between about 0% and about 100% of the thrust limit capability of each rotor 109. For illustrative purposes, if each rotor 109 is selected to operate at about 50% of the thrust limit capability during operation of aircraft 101, each desired thrust demand 152 can be received as 50%. When thrust demands 152 are compared, the maximum thrust demand is thereby 50% and the minimum thrust demand is thereby 50%. The maximum thrust demand of 50% can then be reduced by maximum thrust limit 256 of 100%. Because this difference provides an amount that is less than zero, the maximum thrust demand does not exceed maximum thrust limit 256 such that thrust demand 252 is not adjusted based on maximum thrust limit 256. Minimum thrust limit 266 can be reduced by the minimum thrust demand. If minimum thrust limit 266 is provided at 10% for illustrative purposes, the minimum thrust demand of 50% is above minimum thrust limit 266 such that thrust demand 252 is also not adjusted based on minimum thrust limit 266. Accordingly, each thrust demand 252 can be adjusted by an amount of zero to provide an adjusted thrust demand 262 for each rotor 109 that is equal to the desired thrust demand 252 to continue operating each rotor 109 at 50% capability.

Alternatively, if each rotor 109 is selected to operate at or near about 100% of the thrust limit capability of each rotor 109 while aircraft 101 is near the ground, the ability of aircraft 101 to pitch, roll, and/or turn may be limited in order to prioritize altitude. For instance, in order to pitch, roll, and/or turn aircraft 101, a differential thrust may be needed between one or more rotors 109. To provide a differential between one or more rotors 109, for illustrative purposes, first and second thrust demands 252a, 252b to operate rotors 109 of first and second ducts 107a, 107b can be set to 80% and third and fourth thrust demands 252c, 252d to operate rotors of third and fourth ducts 107c, 107d can be set to 110% to provide a differential of 30% between first and second thrust demands 252a, 252b and third and fourth thrust demands 252c, 252d. In some versions, when it may be desirable to prioritize altitude, minimum thrust limit 266 can be increased, such as to 90% for illustrative purposes.

Accordingly, control 122 can adjust thrust demands 252 based on maximum and/or minimum thrust limits 256, 266. For instance, desired thrust demands 252 can be compared to determine a maximum thrust demand of 110%. A thrust limit 256 of 100% can be subtracted from the maximum thrust demand to provide a difference of 10% that the maximum thrust demand exceeds thrust limit 256. Because the difference is greater than zero, switch 258 can transmit the value of the difference of 10% through filter 259 to difference algorithms 260. Based on maximum thrust limit 256, each thrust demand 252 can then be reduced by the difference of 10% to provide a first and second adjusted thrust demand 262a, 262b of 70% and a third and fourth adjusted thrust demand 262c, 262d of 100%. The desired thrust demands 252 can also be compared to determine a minimum thrust demand of 80%. The minimum thrust demand of 80% can be subtracted from minimum thrust limit 266 of 90% to provide a difference of 10% that the minimum thrust demand is below minimum thrust limit 266. Because the difference is greater than zero, switch 268 can transmit the value of the difference of 10% through filter 269 to difference algorithms 260. If filter 269 includes a gain of 0.5, the difference of 10% can be filtered to a reduced value of 5%. Based on minimum thrust limit 266, each thrust demand 252 can then be increased by the difference of 5% to provide a first and second adjusted thrust demand 262a, 262b of 75% and a third and fourth adjusted thrust demand 262c, 262d of 105%. Accordingly, thrust demands 252 were collectively reduced by a limited amount to provide an adjusted thrust demand 262 that provides an improved differential between one or more rotors 109 to allow aircraft 101 to pitch, roll, and/or turn a limited amount based on altitude of aircraft 101. Still other suitable methods for adjusting thrust demand of aircraft 101 will be apparent to one with ordinary skill in the art in view of the teachings herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of adjusting a directional movement ability in an aircraft having two or more rotors comprises the steps of:
   receiving a plurality of desired thrust demands such that a desired thrust demand is received for each rotor of the two or more rotors;
   comparing, via a processor, the plurality of desired thrust demands to determine a maximum thrust demand of the plurality of desired thrust demands;
   determining, via the processor, whether the maximum thrust demand exceeds a maximum thrust limit of the two or more rotors;
   adjusting each desired thrust demand of the plurality of desired thrust demands based on whether the maximum thrust demand exceeds the maximum thrust limit of the two or more rotors to provide a plurality of adjusted thrust demands such that an adjusted thrust demand is provided for each rotor of the two or more rotors;
   operating each rotor of the two or more rotors based on a respective adjusted thrust demand of the plurality of adjusted thrust demands,
   wherein adjusting each desired thrust demand comprises reducing each desired thrust demand of the plurality of desired thrust demands by an amount that the maximum thrust demand exceeds the maximum thrust limit of the two or more rotors; and
   limiting a collective thrust of the two or more rotors to improve pitch, roll, and/or turning authority of the aircraft during a disturbance.

2. The method of claim 1, wherein operating each rotor of the two or more rotors based on the respective adjusted thrust demand of the plurality of adjusted thrust demands allows the aircraft to move in a select one or more of a directional movements such as pitch, roll, and turn.

3. The method of claim 1 further comprising:
   comparing the plurality of desired thrust demands to determine a minimum thrust demand of the plurality of desired thrust demands;
   determining whether the minimum thrust demand is below a minimum thrust limit of the two or more rotors;
   adjusting each desired thrust demand of the plurality of desired thrust demands based on whether the minimum thrust demand is below the minimum thrust limit of the two or more rotors to provide each adjusted thrust demand.

4. The method of claim 3, wherein adjusting each desired thrust demand comprises increasing each desired thrust demand of the plurality of desired thrust demands by an amount that the minimum thrust demand is below the minimum thrust limit of the two or more rotors.

5. The method of claim 3, wherein adjusting each desired thrust demand comprises increasing each desired thrust demand of the plurality of desired thrust demands by a filtered amount that is less than or equal to the amount that the minimum thrust demand is below the minimum thrust limit of the two or more rotors.

6. The method of claim 3, wherein the adjusted thrust demand based on whether the minimum thrust demand is below the minimum thrust limit of the two or more rotors is configured to limit the ability of the aircraft to move in a select one or more of a directional movements such as pitch, roll, and turn to allow the aircraft to maintain a desired altitude.

7. The method of claim 1, wherein the aircraft includes four rotors, wherein the method comprises:
   receiving four desired thrust demands such that a desired thrust demand is received for each rotor of the four rotors;
   comparing the four desired thrust demands to determine a maximum thrust demand of the four desired thrust demands;
   determining whether the maximum thrust demand exceeds the maximum thrust limit of one of the four rotors;
   collectively adjusting each desired thrust demand of the four desired thrust demands based on whether the maximum thrust demand exceeds the maximum thrust limit to provide four adjusted thrust demands such that an adjusted thrust demand is provided for each rotor of the four rotors; and operating each rotor of the four rotors based on a respective adjusted thrust demand of the four adjusted thrust demands.

8. A method of adjusting a directional movement ability in an aircraft having two or more rotors comprises the steps of:

receiving a plurality of desired thrust demands such that a desired thrust demand is received for each rotor of the two or more rotors;

comparing, via a processor, the plurality of desired thrust demands to determine a maximum thrust demand of the plurality of desired thrust demands;

determining, via the processor, whether the maximum thrust demand exceeds a maximum thrust limit of the two or more rotors;

comparing, via the processor, the plurality of desired thrust demands to determine a minimum thrust demand of the plurality of desired thrust demands;

determining, via the processor, whether the minimum thrust demand is below a minimum thrust limit of the two or more rotors;

adjusting each desired thrust demand of the plurality of desired thrust demands based on a select one or both of an amount that the maximum thrust demand exceeds the maximum thrust limit and an amount that the minimum thrust demand is below the minimum thrust limit to provide a plurality of adjusted thrust demands such that an adjusted thrust demand is provided for each rotor of the two or more rotors;

operating each rotor of the two or more rotors based on a respective adjusted thrust demand of the plurality of adjusted thrust demands;

limiting a collective thrust of the two or more rotors to improve pitch, roll, and/or turning authority of the aircraft during a disturbance; and increasing the collective thrust after the disturbance.

9. The method of claim 8, wherein adjusting each desired thrust demand comprises reducing each desired thrust demand of the plurality of desired thrust demands by an amount that the maximum thrust demand exceeds the maximum thrust limit of the two or more rotors.

10. The method of claim 8, wherein adjusting each desired thrust demand comprises increasing each desired thrust demand of the plurality of desired thrust demands by an amount that the minimum thrust demand is below the minimum thrust limit of the two or more rotors.

11. The method of claim 8, wherein receiving the plurality of desired thrust demands includes receiving a first desired thrust demand for a first rotor of the two or more rotors, receiving a second desired thrust demand for a second rotor of the two or more rotors, receiving a third desired thrust demand for a third rotor of the two or more rotors, and receiving a fourth desired thrust demand for a fourth rotor of the two or more rotors, and wherein comparing the plurality of desired thrust demands includes determining the maximum thrust demand of the first, second, third, and fourth desired thrust demands.

12. A flight control system for controlling directional movement ability of an aircraft having two or more rotors, wherein the flight control system comprises a control coupled with at least one motor of each of the two or more rotors such that the control is configured to actuate the at least one motor to thereby drive the two or more rotors, wherein the control comprises:

a max algorithm incorporated into a processor and configured to receive a desired thrust demand for each rotor of the one or more rotors, wherein the max algorithm is configured to determine a maximum thrust demand of the received desired thrust demands;

a first difference algorithm incorporated into the processor and configured to receive the maximum thrust demand, wherein the first difference algorithm is configured to determine a first difference between the maximum thrust demand and a maximum thrust limit;

a first switch configured to receive the first difference, wherein the first switch is configured to transmit a first signal having a value of the first difference when the first difference is greater than zero, wherein the first switch is configured to transmit the first signal having a value of zero when the first difference is equal to or less than zero; and at least one second difference algorithm configured to receive the first signal from the first switch, wherein the at least one second difference algorithm is configured to subtract the value of the first signal from each of the received thrust demands to provide an adjusted thrust demand for each rotor of the two or more rotors;

wherein the control is configured to actuate the at least one motor of each of the two or more rotors based on the respective adjusted thrust demand; and wherein the control is configured to limit a collective thrust of the two or more rotors to improve pitch, roll, and/or turning authority of the aircraft during a disturbance.

13. The flight control system of claim 12, wherein the control further comprises a filter configured to smooth the first signal of the first switch.

14. The flight control system of claim 12, wherein the control further comprises:

a min algorithm configured to receive a desired thrust demand for each rotor of the one or more rotors, wherein the min algorithm is configured to determine a minimum thrust demand of the received desired thrust demands;

a third difference algorithm configured to receive the minimum thrust demand, wherein the third difference algorithm is configured to determine a second difference between the minimum thrust demand and a minimum thrust limit; and a second switch configured to receive the second difference, wherein the second switch is configured to transmit a second signal having a value of the second difference when the second difference is greater than zero, wherein the second switch is configured to transmit a second signal having a value of zero when the second difference is equal to or less than zero;

wherein the at least one second difference algorithm configured to receive the second signal from the second switch, wherein the at least one second difference algorithm is configured to add the value of the second signal to each of the received thrust demands to provide the adjusted thrust demand for each rotor of the two or more rotors.

15. The flight control system of claim 14, wherein the control further comprises a filter configured to smooth the second signal of the second switch.

* * * * *